(12) United States Patent
Abu-Ageel (10) Patent No.: US 6,847,753 B2
(45) Date of Patent: Jan. 25, 2005

(54) SWITCH-VARIABLE OPTICAL ATTENUATOR AND SWITCH ARRAYS

(76) Inventor: Nayef M. Abu-Ageel, 45K Rolling Green Dr., Fall River, MA (US) 02720

( * ) Notice: Subject to any disclaimer, the term of this patent is extended or adjusted under 35 U.S.C. 154(b) by 335 days.

(21) Appl. No.: 10/017,521

(22) Filed: Dec. 14, 2001

(65) Prior Publication Data

US 2003/0113056 A1 Jun. 19, 2003

(51) Int. Cl.$^7$ .............................. G02B 6/35; G02B 6/26
(52) U.S. Cl. ............................ 385/18; 385/20; 385/22; 385/140
(58) Field of Search ............................. 385/16–23, 140

(56) References Cited

U.S. PATENT DOCUMENTS 6,404,969 B1 * 6/2002 Tayebati et al. ............ 385/140
6,591,032 B2 * 7/2003 Tayebati et al. ............. 385/18

* cited by examiner

Primary Examiner—John D. Lee
(74) Attorney, Agent, or Firm—Steubing McGuinness & Manaras LLP (57) ABSTRACT

Novel light switches and attenuators are disclosed. In one form of the invention, a novel 1×2 switch is formed by positioning a moveable cantilever mirror having an opening intermediate three fiberoptic lines. In another form of the invention, a novel n×n switch is formed by positioning a moveable cantilever mirror having n openings intermediate n sets of three fiberoptic lines. In still another form of the invention, a novel variable optical attenuator is formed by incrementally positioning a moveable cantilever mirror having an opening intermediate a set of three fiberoptic lines.

34 Claims, 10 Drawing Sheets

SWITCH-VARIABLE OPTICAL ATTENUATOR AND SWITCH ARRAYS

FIELD OF THE INVENTION

This invention relates to optical systems in general, and more particularly to switches and attenuators for use in optical systems.

BACKGROUND OF THE INVENTION

In many situations, it is necessary to switch or attenuate an optical signal that is transmitted within an optical system.

By way of example but not limitation, in a typical optical system, it may be necessary to switch or attenuate an optical signal between a first line (e.g., a fiberoptic or fiber line) and a second line (e.g., a fiberoptic or fiber line).

Attenuation and switching techniques that exist in the art do not address the problem of fast and accurate switching and attenuation combined with ease of implementation.

SUMMARY OF THE INVENTION

One object of the present invention is to provide novel apparatus for switching a light signal in an optical system.

Another object of the present invention is to provide novel apparatus for attenuating a light signal in an optical system.

Still another object of the present invention is to provide a novel method for switching a light signal in an optical system.

Yet another object of the present invention is to provide a novel method for attenuating a light signal in an optical system.

These and other objects of the present invention are addressed by the provision and use of novel light switches and attenuators. In one form of the invention, a novel 1×2 switch is formed by positioning a movable mirror having a hole therethrough intermediate three fiberoptic lines. In another form of the invention, an n×n switch is formed by positioning a movable mirror having a plurality of holes therethrough intermediate a plurality of sets of three fiberoptic lines. In still another form of the invention, a novel light attenuator is formed by positioning a movable arm having a hole therethrough intermediate three fiberoptic elements.

BRIEF DESCRIPTION OF THE DRAWINGS

Still other objects and features of the present invention will be more fully disclosed by the following detailed description of the preferred embodiments of the invention, which is to be considered together with the accompanying drawings, wherein like numbers refer to like parts and further wherein.

DETAILED DESCRIPTION OF THE PREFERRED EMBODIMENTS

Figure 1:
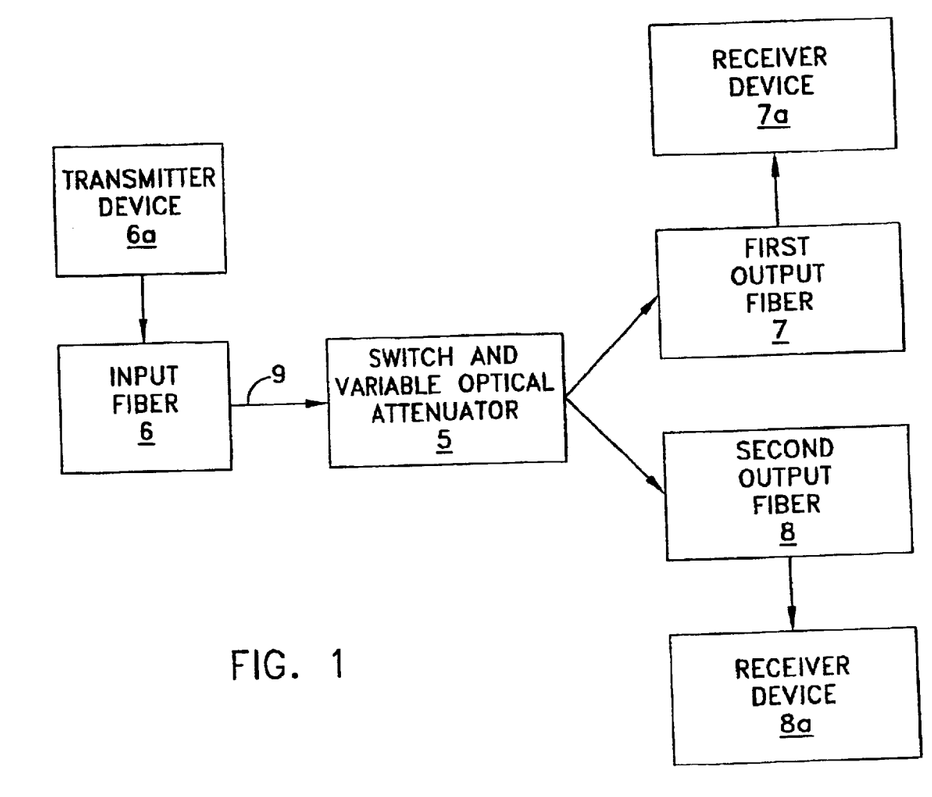
FIG. 1 is a schematic drawing showing the operational use of a switch and variable optical attenuator.

Referring to FIG. 1, there is schematically shown a switch and variable optical attenuator 5 with an input fiber 6, a first output fiber 7 and a second output fiber 8. A transmitter device 6a is attached to input fiber 6. Receiver devices 7a, 8a are attached to output devices 7, 8, respectively. In a preferred embodiment, switch and variable optical attenuator 5 switches a light beam 9, emitted by transmitter device 6a through input fiber 6, between receiver devices 7a, 8a coupled with first output fiber 7 and second output fiber 8, respectively. Additionally, switch and variable optical attenuator 5 may switch light beam 9 traveling from receiver devices 7a, 8a to transmitter device 6a. Alternatively, receiver devices 7a, 8a may comprise a single device with two separate receivers. In another preferred embodiment, switch and variable optical attenuator 5 attenuates light beam 9 as it is switched between first output fiber 7 and second output fiber 8.

Figure 2:
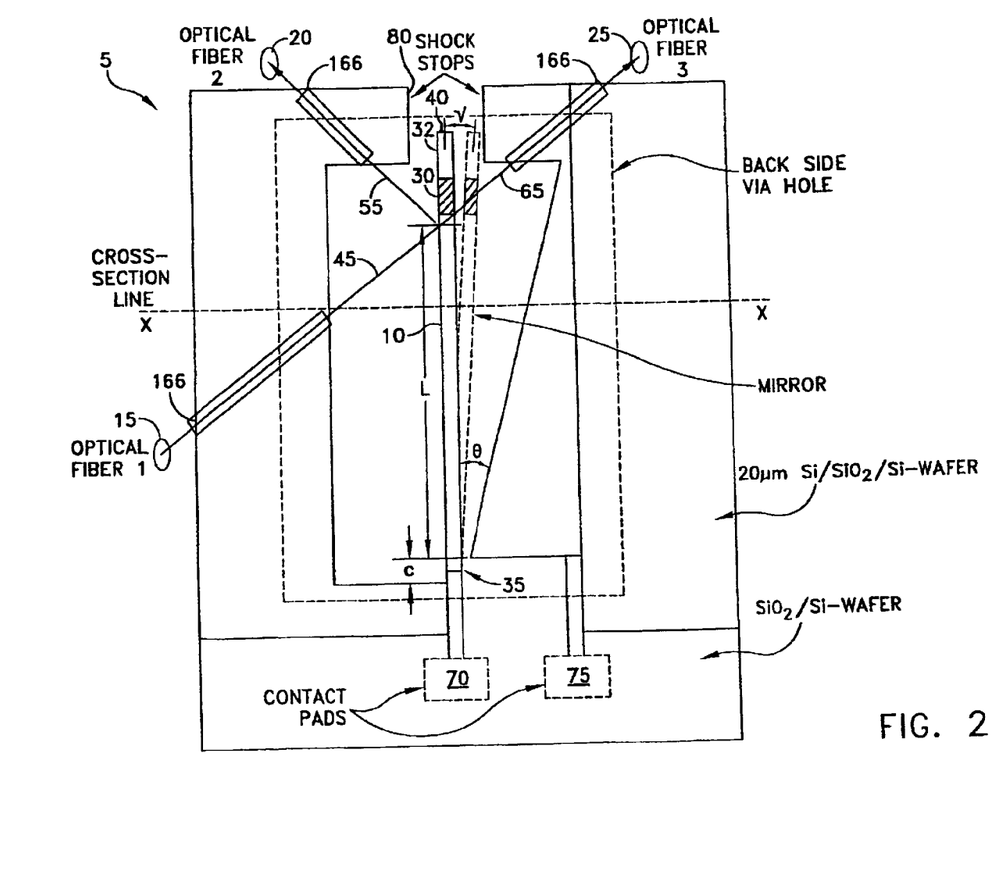
FIG. 2 is a schematic top view showing a novel 1×2 switch.

Looking now at FIG. 2, there is shown a novel 1×2 switch and variable optical attenuator 5 formed in accordance with the present invention. Switch and variable attenuator 5 utilizes a vertical mirror 10 in conjunction with a first fixed optical fiber 15, a second fixed optical fiber 20, and a third fixed optical fiber 25. Input fiber 6, first output fiber 7 and second output fiber 8 (illustrated in FIG. 1) correspond to first fixed optical fiber 15, second fixed optical fiber 20 and third fixed optical fiber 25 (illustrated in FIG. 2), respectively. Each of the fibers 15, 20 and 25 are contained in v-grooves 166 etched into the structure of switch 5. V-grooves 166 are positioned at known angles relative to one another. For example, this angle may be 45°. As such, the paths of light beams 45, 55, 65, and positioning of mirror 10 relative to these paths, are known.

Still looking at FIG. 2, mirror 10 contains an opening 30. Opening 30 may be a physical opening where the light beams constitute visible light. Alternatively, opening 30 may comprise a material that acts as a conduit for particular wavelengths of light while mirror 10 comprises another material that acts as about one end at a point 35. When mirror 10 is in a first end position 40, opening 30 is positioned such that light beam 45 emitted by optical fiber 15 is reflected by mirror 10, adjacent point 50, toward optical fiber 20 along path 55. When mirror 10 is in a second end position 60 (as shown in phantom) opening 30 is positioned such that light beam 45, emitted by optical fiber 15, passes through mirror 10, via opening 30, toward optical fiber 25 along path 65. Although not shown, light beam 45 can pass through mirror 10 via opening 30 toward optical fiber 25 along path 65.

Additionally, mirror 10 may also be positioned between first end position 40 and second end position 60. This incremental positioning of mirror 10 acts as an attenuator in that a first portion of light beam 45 is reflected by mirror 10 to travel along path 55 while a second portion, which includes all or some of the remainder from the first portion of light beam 45, is transmitted through mirror opening 30 along path 65. The first portion of light beam 45 may be configured to increase or decrease in intensity along path 55 toward second optical fiber 20 as mirror 10 is positioned between first end position 40 and second end position 60. The second portion of light beam 45 may also be configured to increase or decrease in intensity along path 65 toward optical fiber 25 as mirror 10 is positioned between first end position 40 and second end position 60.

Furthermore, switch 5 may also selectively transmit light beam 55 and light beam 65 from optical fiber 20 and optical fiber 25, respectively, to optical fiber 15. As such, mirror 10 may operate to switch or attenuate light beam 55 and light beam 65.

Mirror 10 is actuated in the preferred embodiment by applying a voltage between a first contact pad 70 and a second contact pad 75. This voltage difference is transferred from the first contact pad 70 and the second contact pad 75 to a first electrode (not shown) and a second electrode (not shown), respectively. Mirror 10 contains the first electrode (not shown). The voltage difference creates an electrostatic force which causes a first end 32 of mirror 10 to deflect from its original position. As shown in FIG. 2, mirror 10 is unactuated at position 40 and is fully actuated at position 60. It should also be noted that mirror 10 can be partially actuated at any point between position 40 and position 60. Alternatively, mirror opening 30 can be repositioned such that in the unactuated state light beam 45 is transmitted to third fixed optical mirror 25 and in the fully actuated state light beam 45 is reflected toward second fixed optical fiber 20.

In either of the above described configurations, when mirror 10 is in the second end position 60, it is electrostatically held in place against a shock stop 80. As such, mirror 10 will not vibrate due to the electrostatic force holding mirror 10 against shock stop 80. In an alternative embodiment (not shown), another shock stop 80 is also configured opposite to the second end position 60 and adjacent to first end position 40. In this configuration, mirror 10 will not vibrate if an electrostatic force is applied.

In end position 40, without applying an electrostatic force to hold mirror 10 fixedly in place, vibrations may occur in mirror 10. Opening 30 may be sized larger than the width of light beam 45 to compensate for these vibrations.

Figure 3:
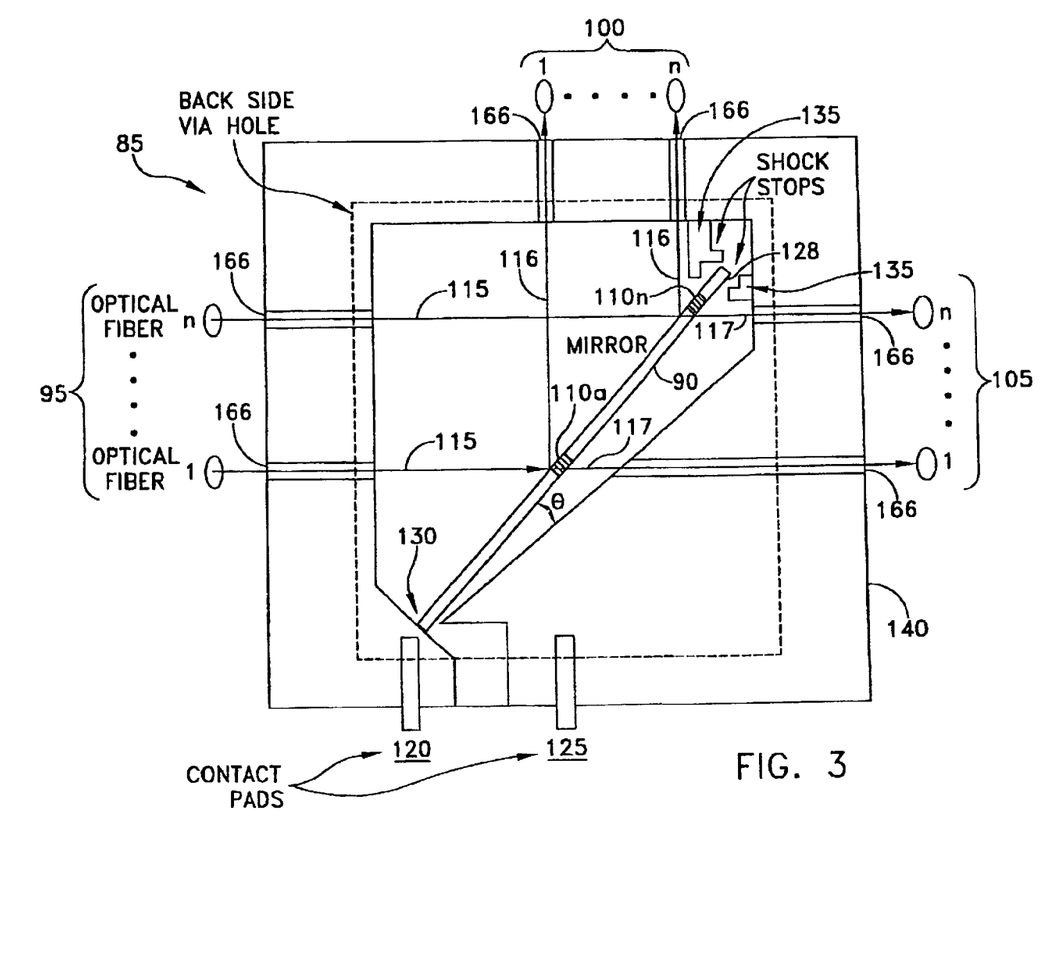
FIG. 3 is a top view showing an n×n switch.

Now referring to FIG. 3, there is shown an n×n switch and variable optical attenuator array 85. Switch array 85 utilizes a mirror 90 and a first series of fixed optical fibers 95, a second series of fixed optical fibers 100, and a third series of fixed optical fibers 105. Each series of optical fibers 95, 100, 105 has a number of optical fibers represented by numerals from 1 to n. Further, the number of optical fibers in each series 90, 100, 105 is typically the same. Mirror 90 contains openings 110a–110n for allowing light beams 115 to pass, in the manner described below. The number of openings 110 is equal to the number of optical fibers, n, in each series. Generally, each of the optical fibers of first series 95 is associated with one of the mirror openings 110, with one of the optical fibers of second series 100 and with one of the optical fibers of third series 105, as illustrated in FIG. 2. That association will be described herein.

Mirror 90 can be positioned at an angle θ to reflect each light beam 115 emitted by the optical fibers of first series 95 toward the optical fibers of the second series 100 along optical path 116, as shown in FIG. 3. By changing the angle θ of mirror 90, each light beam 115, or a portion thereof, is allowed to pass through its respective opening of openings 110 and toward the optical fibers of the third series 105 along optical path 117.

In an alternative embodiment, mirror 90 has nonuniformly configured openings 110. In such a configuration, openings 110 cause some light beams 115 to be reflected into the optical fibers of the second series 100 while other light beams 115 pass through mirror openings 110 toward the optical fibers of the third series 105. Each of the openings 110 may be uniquely positioned in mirror 90 to allow varying degrees of intensity of light to be reflected and/or transmitted to the several optical fibers along the second and third series 100, 105 while the mirror 90 is at a single position.

Mirror 90 is actuated in the preferred embodiment by applying a voltage between first contact pad 120 and second contact pad 125. This voltage difference is transferred from the first contact pad 120 and the second contact pad 125 to a first electrode (not shown) and to a second electrode (not shown), respectively. Mirror 90 contains the first electrode (not shown). The applied voltage difference creates an electrostatic force which causes a first end 128 of mirror 90 to deflect from its original position opposite its base at a second end 130. A shock stop 135 is positioned adjacent to the first end 128 end of mirror 90, opposite to its base adjacent to point 130, at each terminal portion of deflection.

Figure 4A:
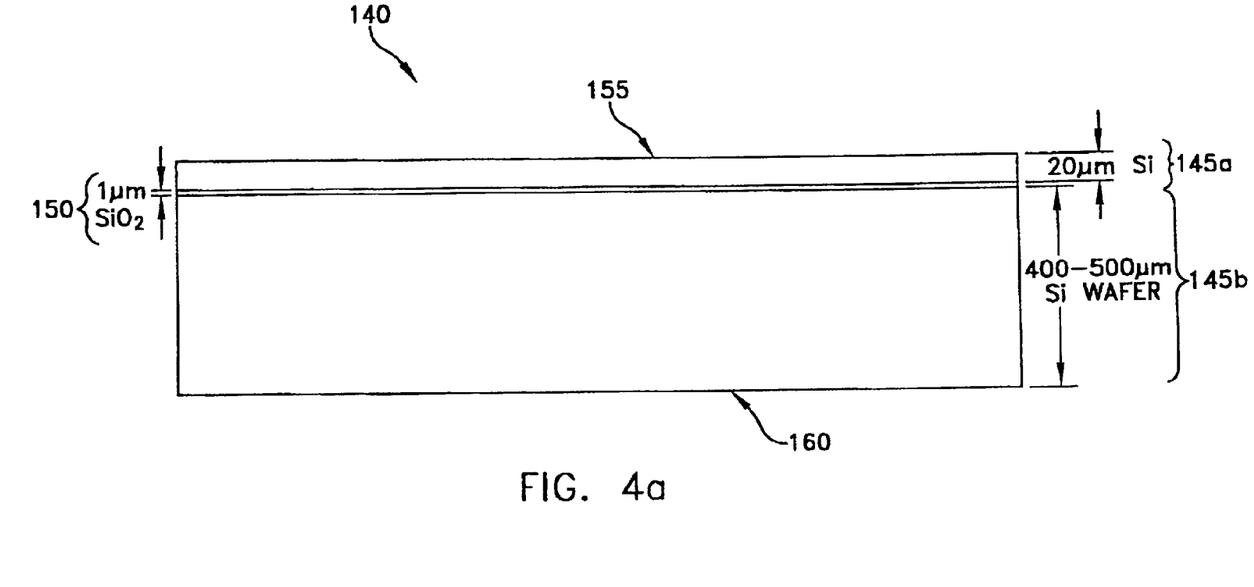
FIGS. 4a–4d are cross-sectional side views showing the fabrication of the 1×2 switch of FIG. 2.
Figure 4B:
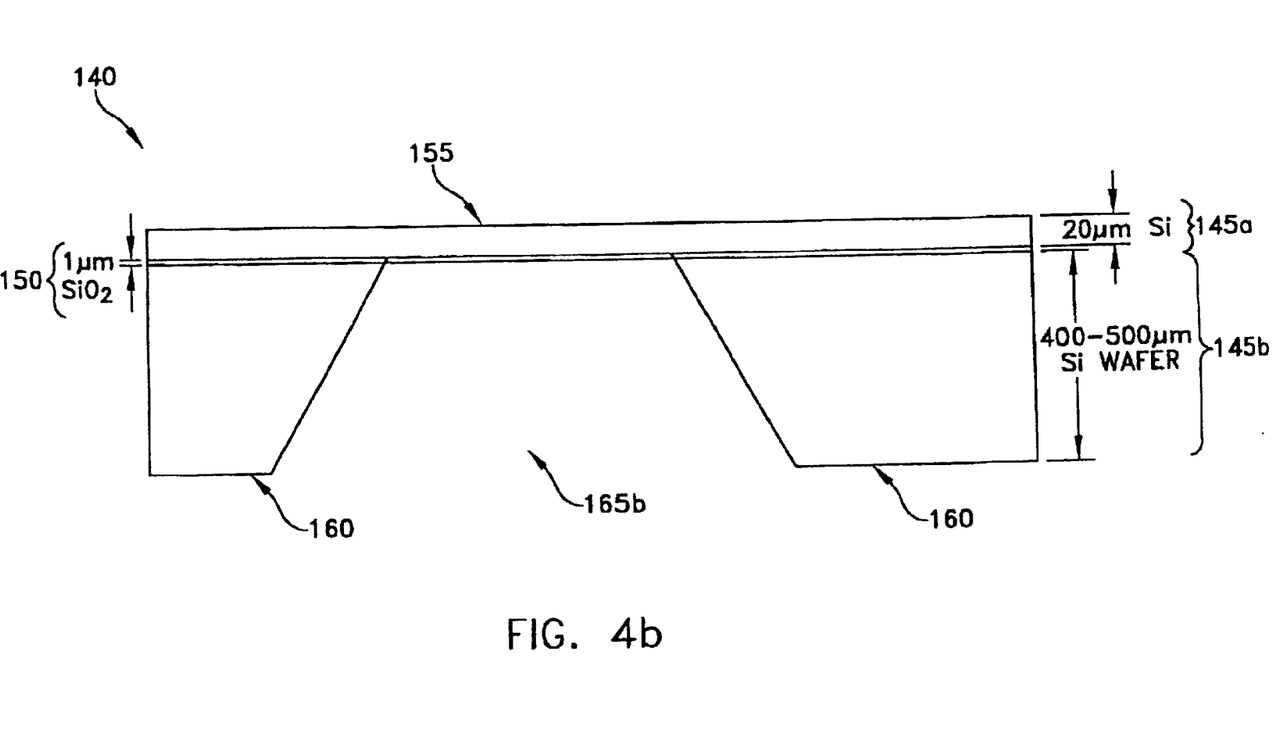

Now looking at FIGS. 2, 4a–4d, 5a–5b, and 6, a method is disclosed for the fabrication of a switch. As seen in FIG. 4a, a SOI wafer 140 is provided having two Si layers 145a and 145b with a SiO layer 150 therebetween. Alternatively, the switch may be configured out of two conducting materials separated by an insulating layer therebetween; or two non-conducting layers separated by an insulating layer, provided that electrodes are deposited onto the non-conducting materials, e.g., GaAs/SiO$_2$/GaAs. In essence, the wafer may be fabricated out of two etchable materials separated by an etchant stop. Next, top side 155 of the wafer 140 is configured with a pattern (not shown) and on the bottom side 160 of the wafer 140 is also configured with a pattern (not shown). These patterns guide the etching described herein. An etchant is applied to the bottom side 160 to realize an initial portion via-hole 165b through 5i substrate 145b (see FIG. 4b). In a preferred embodiment, a wet etchant, such as KOH, is used to realize the initial portion via-hole 165b in the bottom side 160 of Si substrate 145b.

Figure 4C:
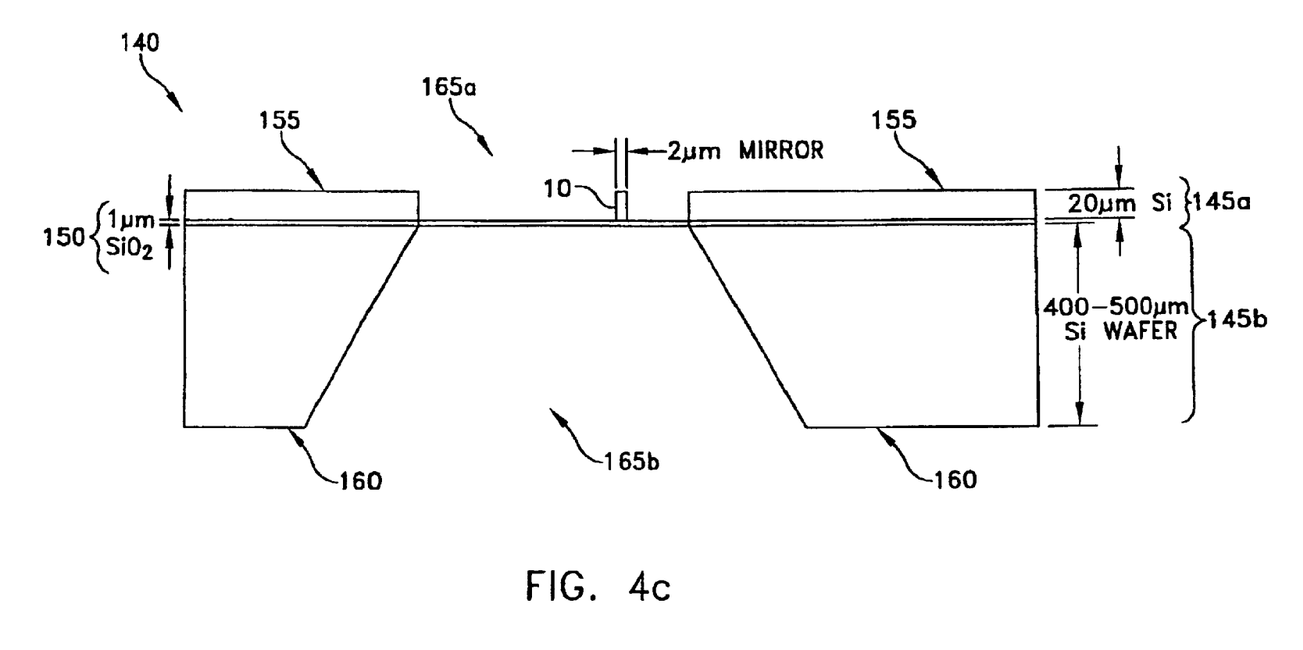

Now looking at FIGS. 2 and 4c, an etchant is applied to the top side 155 to realize v-grooves 166 and mirror 10. In a preferred embodiment, a wet etchant, such as KOH, is used to realize v-grooves 166 (see FIG. 2) and mirror 10 (see FIG. 4c) in Si substrate 145a.

Figure 5A:
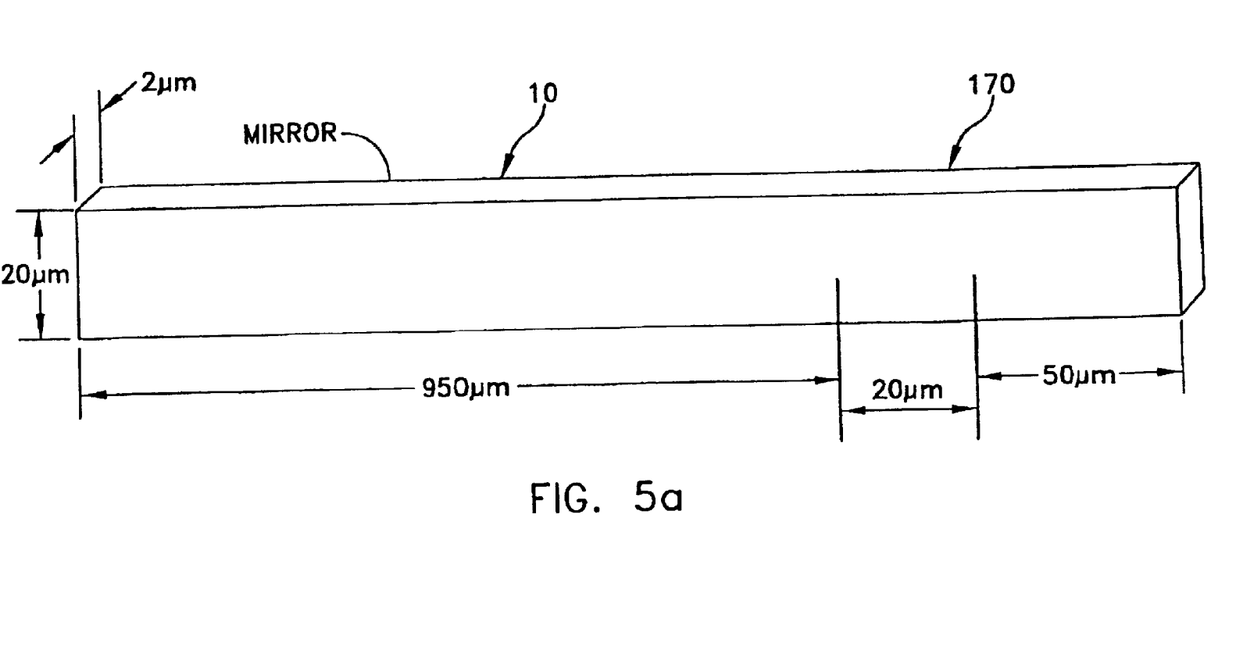
FIGS. 5a–5b are cross-sectional side views showing the formation of a hole through the mirror of the 1×2 switch shown in FIG. 2.
Figure 5B:
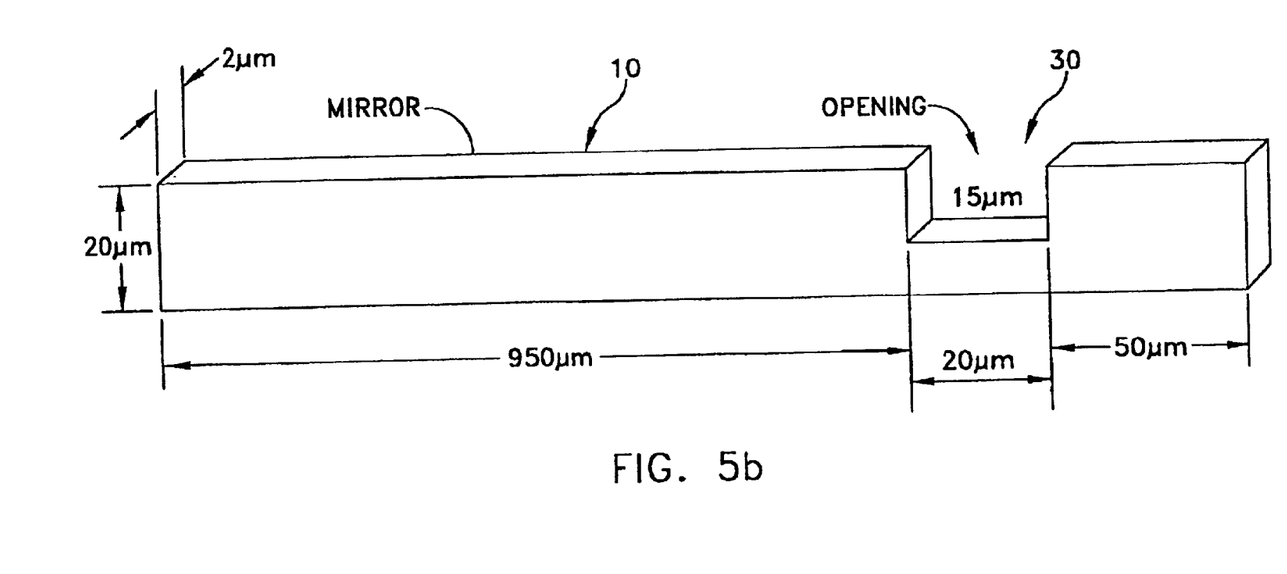
Figure 6:
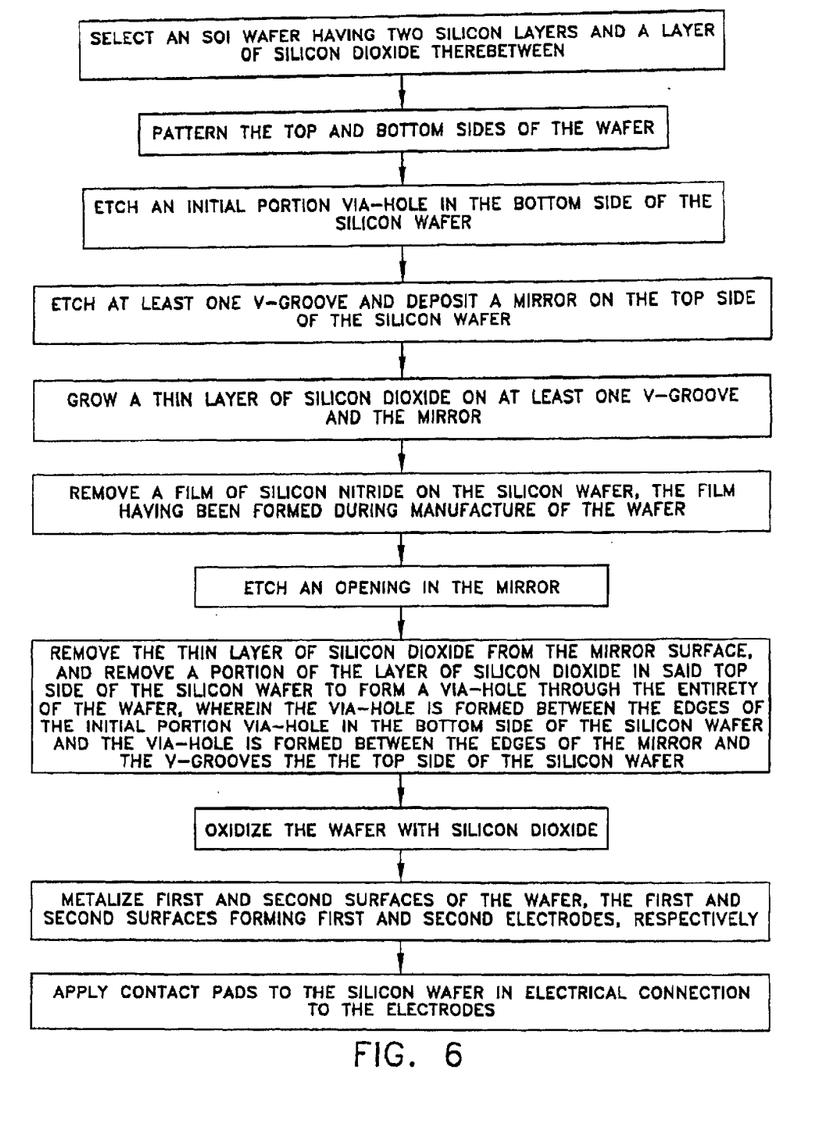
FIG. 6 is a schematic diagram showing a method for making the switch of FIG. 2.

Looking at FIGS. 5a and 5b, opening 30 is realized in mirror 10 using Deep Reactive Ton Etching (DRIE). In order to begin formation of opening 30, a thin layer of SiO$_2$ is grown to protect each V-groove 166 (see FIG. 2) and mirror 10 (see FIG. 4c). Any protective film previously applied to wafer 140, such as during its manufacture, is removed using Deep Reactive Ion Etching (DRIE). Such a protective film may include a silicon nitride film (not shown). For example, one method of forming opening 30 includes applying etchant in two timed steps at portion 170 (see FIG. 5a) with opening 30 being realized at the conclusion of the application.

Figure 4D:
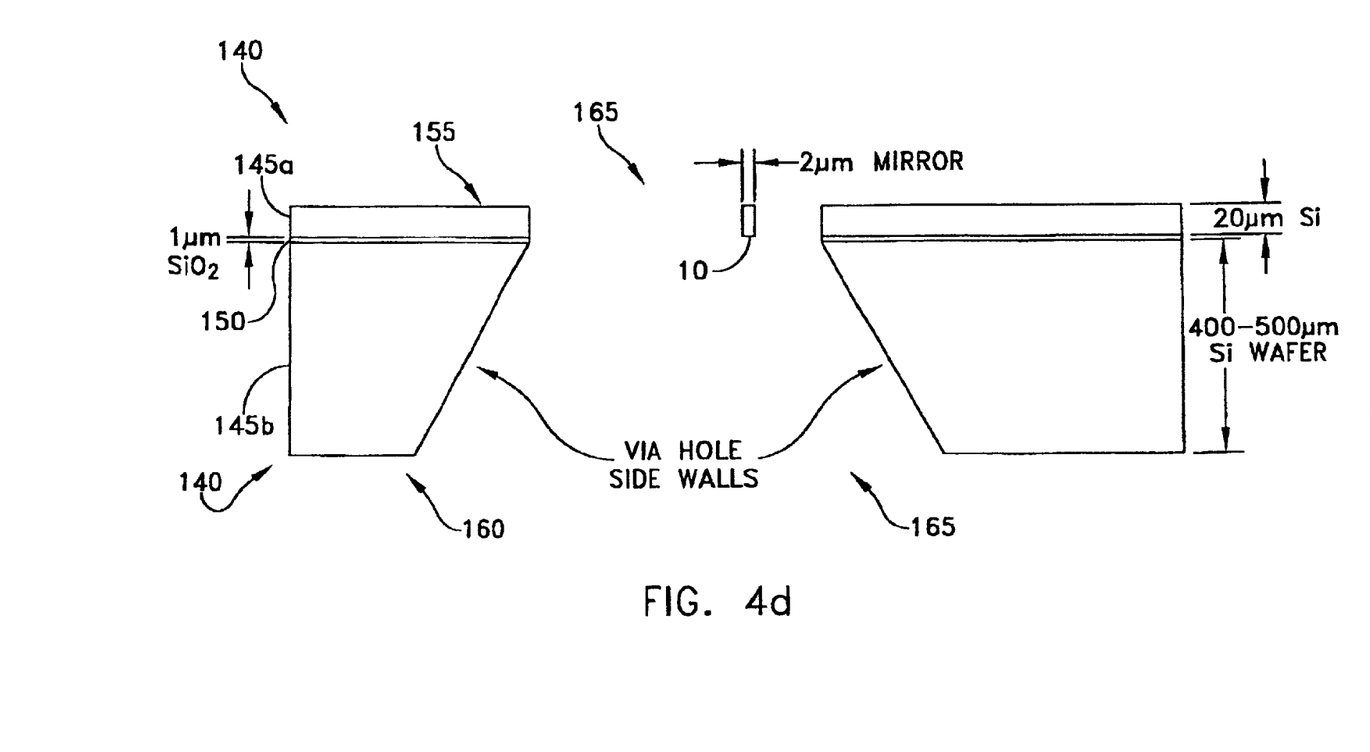

Now looking at FIGS. 4c and 4d, a via-hole 165a is realized to complete a via-hole 165 through wafer 140 (see FIG. 4d). First, the SiO$_2$ layer (not shown) is removed from the surface of mirror 10. Second, the SiO$_2$ layer 150 is removed from between the openings 165a, 165b formed in each of the Si substrate layers 145a, 145b. For example, in a preferred embodiment a buffered oxide etchant is used to remove the SiO$_2$.

In order to finalize switch 5, looking at FIGS. 2 and 4d, wafer 140 is oxidized and electrodes are added as described below. One preparation method includes oxidizing wafer 140 with 100 nm of silicon dioxide. Then, a first surface (not shown) and a second surface (not shown) of wafer 140 are each metalized to form a first electrode (not shown) and second electrode (not shown), respectively. In a preferred embodiment, the surface of mirror 10 is one of the electrodes. The surface of this electrode also provides an enhanced reflecting surface. As such, the metalization deposition provides reflectance for the mirror 10 as well as the conductance for the electrode. An example of a metalization deposition involves first covering a surface with chromium for adhesion and then covering the chromium surface with gold to create an electrode. First, contact pad 120 and second contact pad 125 are applied to wafer 140 and are electrically connected to the first electrode and the second electrode, respectively. To complete fabrication of switch 5, the mirror structure is diced from the wafer and placed onto an optical component package. The preceding sequence of steps illustrated above may be varied, e.g., top side 155 could be etched prior to etching bottom side 160, etc.

The silicon wafer 140 is typically composed of a single crystalline structure, referred to as "(100) silicon". The Miller indicies "(100)" describes the crystalline structure of a unit cube of silicon. The structural configuration of the "100" silicon causes etching to occur at a 45° angle relative to the origin of the unit cube. This is advantageous in that wafer 140 is etched at a known angle, which subsequently allows the precise alignment of optical fibers 15, 20 and 25. Additionally, due to the structural configuration of the silicon wafer, etching permits mirror 10 to be formed with a very flat surface.

Higher yields and lower costs for production of optical switches are possible due to the simplicity of the fabrication process, described above. Standard starting materials, such as 4-inch and 6-inch wafers, can be used for fabrication. Wet etching of wafer 140, described above, is usually a multi-wafer process. Deep Reactive Ion Etching (DRIE) of wafer 140, which is usually a single wafer process, has a low process time. These factors allow high volume production using this fabrication process.

Additionally, the SiO layer acts as an insulator to reduce the current loss into the silicon wafer. This configuration reduces the power requirements of the unit.

What is claimed is:

1. A switch for directing the path of a light signal, said switch comprising;

a member comprising an opening and a reflecting surface disposed such that the light signal defines an angle of incidence relative to the member;

first, second and third light transmitting elements, said first and third elements being disposed to receive first and second light signals from said member; and means for moving said member so as to change the angle of incidence of the light signal relative to the member so as to selectively position said opening intermediate said first and second light transmitting elements, so as to optically couple said first and second light transmitting elements.

2. A switch according to claim 1 wherein said member movement means selectively position said reflecting surface intermediate said first and second light transmitting elements, so as to optically couple said first and third light transmitting elements.

3. A switch according to claim 1 wherein said means for moving said member moves said member so as to selectively position said opening intermediate a portion of the optical path between said first and second light transmitting elements and simultaneously position said reflecting surface intermediate another portion of the optical path between said first and second light transmitting elements, so as to optically couple said first and second light transmitting elements and simultaneously, to optically couple said first and third light transmitting elements.

4. A switch according to claim 1 wherein said member comprises a cantilever beam having a mirror surface containing a hole.

5. A switch according to claim 1 wherein said first, second and third light transmitting elements comprise fiberoptic elements.

6. A switch according to claim 1 wherein said means for moving said member comprises a microelectromechanical (MEM) device.

7. A switch according to claim 1 further comprising a plurality of sets of first, second and third light transmitting elements, and said member further comprising a plurality of openings and reflectors corresponding with said sets of light transmitting elements.

8. A switch according to claim 7 wherein said openings have a direct one-to-one correlation with said sets of light transmitting elements.

9. An optical attenuator operative to attenuate an optical signal, comprising:

a member comprising an opening and a reflecting surface, disposed such that the light signal defines an angle of incidence relative to the member;

first, second and third light transmitting elements, said first and third elements being disposed to receive first and second light signals from said member; and means for moving said member so as to change the angle of incidence of the light signal relative to the member so as to selectively position said opening intermediate a portion of the optical path between said first and second light transmitting elements.

10. An optical attenuator according to claim 9 wherein said member movement means simultaneously position said reflecting surface intermediate another portion of the optical path between said first and second light transmitting elements, so as to optically couple said first and second light transmitting elements, and simultaneously, to optically couple said first and third light transmitting elements.

11. An optical attenuator according to claim 9 wherein said member movement means selectively position said opening intermediate said first and second light transmitting elements, so as to optically couple said first and second light transmitting elements.

12. An optical attenuator according to claim 9 wherein said member movement means selectively position said reflecting surface intermediate said first and second light transmitting elements, so as to optically couple said first and third light transmitting elements.

13. An optical attenuator according to claim 9 wherein said member comprises a cantilever beam having a mirror surface containing an opening.

14. An optical attenuator according to claim 9 wherein said first second and third light transmitting elements comprise fiberoptic elements.

15. An optical attenuator according to claim 9 wherein said means for moving said member comprises a microelectromechanical (MEM) device.

16. An optical attenuator according to claim 9 further comprising a plurality of sets of first, second and third light transmitting elements, and said member further comprising a plurality of openings and reflectors corresponding with said sets of light transmitting elements.

17. An optical attenuator according to claim 16 wherein said openings have a direct, one-to-one correlation with said sets of light transmitting elements.

18. A method for fabricating a switch for directing the path of a light signal, said method comprising:

selecting a SOI wafer having two silicon layers and a layer of silicon dioxide therebetween;

patterning the top and bottom sides of said wafer;

etching an initial portion via-hole in said bottom side of said silicon wafer;

etching at least one V-groove and depositing a mirror on said top side of said silicon wafer;

growing a thin layer of silicon dioxide an said at least one V-groove and said mirror;

removing a film of silicon nitride on said silicon wafer said silicon nitride film being formed during manufacture of said wafer;

etching an opening in said mirror;

removing said thin layer of silicon dioxide from said mirror surface and removing a portion of said layer of silicon dioxide in said top side of said silicon wafer to form a via-hole through the entirety of said wafer wherein said via-hole is formed between the edge of said initial portion via-hole in said bottom side of said silicon wafer and said via-hole is formed between the edges of said mirror and said V-grooves in said top side of said silicon wafer;

oxidizing said wafer with silicon dioxide;

metalizing first and second surfaces of said wafer, said first and second surfaces forming first and second electrodes, respectively; and applying contact pads to said silicon wafer in electrical connection to said electrodes.

19. A method for fabricating a switch for directing the path of a light signal according to claim 18 wherein the step of realizing a via-hole in said bottom side of said silicon wafer includes using a wet etchant.

20. A method for fabricating a switch for directing the path of a light signal according to claim 19 wherein said wet etchant is KOH.

21. A method for fabricating a switch for directing the path of a light signal according to claim 18 wherein the step of realizing said V-grooves and said mirror in said top side of said silicon wafer includes using a wet etchant.

22. A method for fabricating a switch for directing the path of a light signal according to claim 21 wherein said wet etchant is KOH.

23. A method for fabricating a switch for directing the path of light according to claim 18 wherein the step of removing a film of silicon nitride formed on said silicon wafer includes using deep reactive ion etching.

24. A method for fabricating a switch for directing the path of light according to claim 18 wherein the step of realizing an opening in said mirror includes using deep reactive ion etching.

25. A method for fabricating a switch for directing the path of light according to claim 24 wherein the step of realizing an opening in said mirror further comprises two timed applications of deep reactive ion etching wherein said opening is realized at the conclusion of said applications.

26. A method for fabricating a switch for directing the path of light according to claim 18 wherein the step of removing said thin layer of silicon dioxide from said mirror surface, and removing said layer of silicon dioxide to form a via-hole through the entirety of said wafer includes using a buffered oxide etchant to remove said silicon dioxide.

27. A method for fabricating a switch for directing the path of light according to claim 18 wherein the step of oxidizing said wafer with silicon dioxide includes oxidizing said wafer with a layer of about 100 nm of silicon dioxide.

28. A method for fabricating a switch for directing the path of light according to claim 18 wherein one of said first and second metalized surfaces is a reflecting surface of said mirror.

29. A method for fabricating a switch for directing the path of light according to claim 18 wherein the step of metalizating said first and second surfaces of said wafer comprises covering said surfaces with an adhesive substance and then with an electrode substance.

30. A method for fabricating a switch for directing the path of light according to claim 29 wherein said adhesive substance is chrome.

31. A method for fabricating a switch for directing the path of light according to claim 30 wherein said electrode substance is gold.

32. A method for fabricating an optical attenuator, said method comprising:

selecting a SOI wafer having two silicon layers and a layer of silicon dioxide therebetween;

patterning the top and bottom sides of said wafer/etching an initial portion via-hole in said bottom side of said silicon wafer;

etching at least one V-groove and depositing a mirror on said top side of said silicon wafer;

growing a thin layer of silicon dioxide on said at least one V-groove and said mirror/removing a film of silicon nitride on said silicon wafer, said film formed during manufacture of said wafer;

etching an opening in said mirror;

removing said thin layer of silicon dioxide on said mirror surface/and removing a portion of said layer of silicon dioxide in said top side of said silicon wafer to form a via-hole through the entirety of said wafer, wherein said via-hole is formed between the edges of said initial portion via-hole in said j bottom side of said silicon wafer and said via-hole is formed between the edges of said mirror and said V-grooves on said top side of said silicon wafer;

oxidizing said wafer with silicon dioxide;

metalizing first and second surfaces of said wafer, said first and second surfaces forming first and second electrodes, respectively; and applying contact pads to said silicon wafer in electrical connection to said electrodes.

33. A method for directing the path of a light signal, said method comprising:

providing a switch for directing the path of a light signal, said switch comprising:

a member comprising an opening and a reflecting surface, disposed such that the light signal defines an angle of incidence relative to the member;

first, second and third light transmitting elements, said first and third elements being disposed to receive first and second light signals from said member; and means for moving said member so as to change the angle of incidence of the light signal relative to the member so as to selectively position said opening intermediate said first and second light transmitting elements, so as to optically couple said first and second light transmitting elements;

positioning said opening of said member intermediate first and second light transmitting elements, wherein said switch optically couples said first and second light transmitting elements.

34. A method for directing the path of a light signal of claim 33 wherein said member movement means selectively position said reflecting surface intermediate said first and second light transmitting elements, so as to optically couple said first and third light transmitting elements/said method further comprising a method step of positioning said reflecting surface, wherein said switch optically couples said first and third light transmitting elements.

* * * * *